(12) United States Patent
Ohno et al.

(10) Patent No.: US 8,110,274 B2
(45) Date of Patent: *Feb. 7, 2012

(54) HONEYCOMB STRUCTURE, HONEYCOMB STRUCTURE AGGREGATE, AND HONEYCOMB STRUCTURE CATALYST

(75) Inventors: Kazushige Ohno, Gifu (JP); Masafumi Kunieda, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 250 days.

This patent is subject to a terminal disclaimer.

(21) Appl. No.: 11/371,068

(22) Filed: Mar. 9, 2006

(65) Prior Publication Data
US 2006/0292340 A1 Dec. 28, 2006

(51) Int. Cl.
| B32B 3/12 | (2006.01) |
| B32B 5/16 | (2006.01) |
| B32B 3/20 | (2006.01) |
| B32B 3/26 | (2006.01) |
| D04H 1/64 | (2006.01) |
| B60K 13/04 | (2006.01) |
| B01D 39/06 | (2006.01) |

(52) U.S. Cl. ..... 428/116; 428/330; 428/188; 428/304.4; 264/128; 180/309; 55/523

(58) Field of Classification Search ............ 428/116, 428/117, 118, 119, 188, 913, 327, 73, 307.5, 428/34.5, 177, 304.4, 192; 501/118, 119, 501/120, 153, 154; 55/523, 585.3, 483, 502, 55/529; 264/177.12

See application file for complete search history.

(56) References Cited

U.S. PATENT DOCUMENTS

| 5,518,678 | A | * | 5/1996 | Miyamoto et al. ........ 264/177.12 |
| 5,628,975 | A | * | 5/1997 | Horiuchi et al. ............ 423/213.2 |
| 6,066,587 | A | | 5/2000 | Kurokawa et al. |
| 6,159,578 | A | | 12/2000 | Ichikawa |
| 6,227,699 | B1 | * | 5/2001 | Wight, Jr. ..................... 366/336 |
| 6,696,130 | B1 | * | 2/2004 | Kasai et al. .................. 428/116 |
| 2002/0183191 | A1 | | 12/2002 | Faber et al. |
| 2004/0045267 | A1 | * | 3/2004 | Ichikawa et al. ............... 55/523 |
| 2005/0109023 | A1 | | 5/2005 | Kudo et al. |

(Continued)

FOREIGN PATENT DOCUMENTS

DE 43 41 159 A1 6/1995

(Continued)

OTHER PUBLICATIONS

U.S. Appl. No. 11/414,361, filed on May 1, 2006 entitled Exhaust Gas Cleanup System.

(Continued)

Primary Examiner — David Sample
Assistant Examiner — Nicole T Gugliotta
(74) Attorney, Agent, or Firm — Finnegan, Henderson, Farabow, Garrett & Dunner LLP

(57) ABSTRACT

A honeycomb structure is disclosed that includes plural through-holes separated by plural partition walls and provided in parallel along a longitudinal direction, wherein the thickness of each of the partition walls is less than or equal to about 0.25 mm, the length of each of the through-holes is equal to or greater than about 50-fold of a hydraulic diameter of each of the through-holes and less than or equal to about 350-fold of the hydraulic diameter of each of the through-holes, and an open area ratio (X) % of a cross section of the honeycomb structure perpendicular to the through-holes and a surface area per unit volume (Y (m2/L)) satisfy $Y \geq 250 \times X + 22500$ (about $50 \leq X \leq$ about 85).

4 Claims, 6 Drawing Sheets

U.S. PATENT DOCUMENTS

| | | | |
|---|---|---|---|
| 2005/0227869 A1* | 10/2005 | Ohno et al. ............... | 502/439 |
| 2005/0266992 A1 | 12/2005 | Ohno | |
| 2006/0172113 A1 | 8/2006 | Kunieda | |
| 2006/0177629 A1 | 8/2006 | Kunieda | |
| 2006/0210765 A1* | 9/2006 | Ohno et al. ............... | 428/116 |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292336 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292341 A1 | 12/2006 | Ohno et al. | |
| 2006/0292342 A1 | 12/2006 | Ohno et al. | |
| 2007/0004592 A1 | 1/2007 | Ohno et al. | |
| 2007/0004593 A1 | 1/2007 | Ohno et al. | |
| 2007/0077190 A1 | 4/2007 | Ohno et al. | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |

FOREIGN PATENT DOCUMENTS

| | | | |
|---|---|---|---|
| EP | 0 040 980 A1 | 12/1981 | |
| EP | 0 622 530 A1 | 11/1994 | |
| EP | 0 816 065 A1 | 1/1998 | |
| EP | 1 142 619 A1 | 10/2001 | |
| EP | 1 249 262 A1 | 10/2002 | |
| EP | 1338326 A1 * | 8/2003 | |
| EP | 1 479 881 A1 | 11/2004 | |
| EP | 1 482 138 A1 | 12/2004 | |
| EP | 1 598 102 A1 | 11/2005 | |
| EP | 1 707 545 A1 | 10/2006 | |
| JP | 05-213681 | 8/1993 | |
| JP | 07-039760 | 2/1995 | |
| JP | 08-012460 A | 1/1996 | |
| JP | 10-26416 | 10/1998 | |
| JP | 10-263416 A | 10/1998 | |
| JP | 11-188236 | 7/1999 | |
| JP | 2000-042420 | 2/2000 | |
| JP | 2000-210512 | 8/2000 | |
| JP | 2001-096112 | 4/2001 | |
| JP | 2001-096116 A | 4/2001 | |
| JP | 2001-097777 A | 4/2001 | |
| JP | 2001-162119 * | 6/2001 | |
| JP | 2001-190916 | 7/2001 | |
| JP | 2003-245547 | 9/2003 | |
| JP | 2004-028186 | 1/2004 | |
| JP | 2005-218935 | 8/2005 | |
| WO | WO 03/067041 A1 | 8/2003 | |
| WO | WO 03/091182 | 11/2003 | |
| WO | WO 2004/076027 | 9/2004 | |
| WO | 2005/021193 | 11/2005 | |
| WO | WO 2006/025283 A1 | 3/2006 | |
| WO | WO 2006/070540 A1 | 7/2006 | |

OTHER PUBLICATIONS

European Search Report.
U.S. Appl. No. 11/925,394, filed Jun. 8, 2007, entitled Honeycomb Structured Body, Method for Manufacturing Honeycomb Structured Body and Honeycomb Structured Body Manufacturing Apparatus.
U.S. Appl. No. 11/853,658, filed Sep. 11, 2007, entitled Catalyst Carrier.
U.S. Appl. No. 11/928,546, filed Oct. 30, 2007, entitled Mixed Particles and Honeycomb Structure for Gas Conversion Apparatus.
Co-pending U.S. Appl. No. 12/379,768, filed Feb. 27, 2009.
Co-pending U.S. Appl. No. 12/516,813, filed May 29, 2009.
Co-pending U.S. Appl. No. 12/194,888.
Co-pending U.S. Appl. No. 12/238,057.
Co-pending U.S. Appl. No. 12/245,821.
Co-pending U.S. Appl. No. 12/246,899.
Co-pending U.S. Appl. No. 12/246,881.
Co-pending U.S. Appl. No. 12/239,342.
Co-pending U.S. Appl. No. 12/246,913.
Co-pending U.S. Appl. No. 12/246,869.
Co-pending U.S. Appl. No. 12/248,647.
Co-pending U.S. Appl. No. 12/248,675.
XP-002326698, "Tier 2/LEV II Emission Control Technologies for Light-Duty Gasoline Vehicles," Manufacturers of Emission Controls Association, Aug. 2003, pp. 1-41.
XP-002326699, Claus-Dieter Vogt et al., "Development Status of Ceramic Supported Catalyst," Material Aspects in Automotive Catalytic Converters, pp. 173-185, 2002.
Co-pending U.S. Appl. No. 12/407,645, filed Mar. 19, 2009, to Kazushige Ohno et al., entitled "Honeycomb Structure and Method for Manufacturing Honeycomb Structure".
Co-pending U.S. Appl. No. 12/248,625, filed Oct. 9, 2008, to Masafumi Kunieda et al., entitled "Honeycomb Structural Body".
Co-pending U.S. Appl. No. 12/271,216, filed Nov. 14, 2008, to Kazushige Ohno et al., entitled "Honeycomb Structure and Exhaust Gas Treating Apparatus".
Co-pending U.S. Appl. No. 12/368,514, filed Feb. 10, 2009, to Masafumi Kunieda et al., entitled "Honeycomb Structure".
Co-pending U.S. Appl. No. 12/346,628, filed Dec. 30, 2008, to Kazushige Ohno et al., entitled "Honeycomb Structure".
Co-pending U.S. Appl. No. 12/346,610 filed Dec. 30, 2008, to Masafumi Kunieda et al., entitled "Honeycomb Structure".
Co-pending U.S. Appl. No. 12/367,780, filed Feb. 9, 2009, to Kazushige Ohno et al., entitled "Honeycomb Structure".
Co-pending U.S. Appl. No. 12/389,338 filed Feb. 19, 2009, to Kazushige Ohno et al., entitled "Honeycomb Structure".
Co-pending U.S. Appl. No. 12/358,937, filed Jan. 23, 2009, to Kazushige Ohno et al., entitled "Honeycomb Structure".
Co-pending U.S. Appl. No. 12/389,343, filed Feb. 19, 2009, to Kazushige Ohno et al., entitled "Honeycomb Structure and Process for Manufacturing Honeycomb Structure".
Co-pending U.S. Appl. No. 12/359,957, filed Jan. 26, 2009, to Kazushige Ohno et al., entitled "Honeycomb Structure".
Co-pending U.S. Appl. No. 12/343,965, filed Dec. 24, 2008, to Kazushige Ohno et al., entitled "Honeycomb Structure and Manufacturing Method of the Honeycomb Structure".
Co-pending U.S. Appl. No. 12/359,969, filed Jan. 26, 2009, to Kazushige Ohno et al., entitled "Honeycomb Structure".
Co-pending U.S. Appl. No. 12/369,347, filed Feb. 11, 2009, to Kazushige Ohno et al., entitled "Honeycomb Structure".
Co-pending U.S. Appl. No. 12/372,192, filed Feb. 17, 2009, to Kazushige Ohno et al., entitled "Honeycomb Structure".
Co-pending U.S. Appl. No. 12/372,229, filed Feb. 17, 2009, to Kazushige Ohno et al., entitled "Honeycomb Structure".
Co-pending U.S. Appl. No. 12/368,551, filed Feb. 10, 2009, to Kazushige Ohno et al., entitled "Honeycomb Structure".
Co-pending U.S. Appl. No. 12/362,310, filed Jan. 29, 2009, to Kazushige Ohno et al., entitled "Honeycomb Structure, Exhaust Gas Cleaning Unit, and Manufacturing Method of Honeycomb Structure".
Co-pending U.S. Appl. No. 12/355,999, filed Jan. 19, 2009, to Kazushige Ohno et al., entitled "Honeycomb Structure".
Co-pending U.S. Appl. No. 12/355,990, filed Jan. 19, 2009, to Kazushige Ohno et al., entitled "Honeycomb Structure".
Japanese Office Action dated Oct. 4, 2011 in counterpart application JP 2007-522181.
English translation of Japanese Office Action dated Oct. 4, 2011 in JP 2007-522181.

* cited by examiner

HONEYCOMB STRUCTURE, HONEYCOMB STRUCTURE AGGREGATE, AND HONEYCOMB STRUCTURE CATALYST

BACKGROUND OF THE INVENTION

1. Field of the Invention

The present invention relates to a honeycomb structure, a honeycomb structure aggregate, and a honeycomb catalyst.

2. Description of the Related Art

In the related art, a honeycomb catalyst, which includes a medium carried by a honeycomb structure and is used for conversion of exhaust gas from vehicles, is fabricated by disposing materials of high specific surface area like active alumina and catalysts like platinum on the surface of a monolithic cordierite-based honeycomb structure. In addition, the honeycomb catalyst carries an alkali-earth metal like barium to act as an occlusion-type NOx catalyst for processing NOx in an oxygen-rich atmosphere, such as atmospheres in a lean-burn engine or a Diesel engine.

In order to further improve conversion performance, it is necessary to increase the contact probability between the exhaust gas and the catalyst element and the NOx occlusion agent as well. For this purpose, it is required to increase the specific surface area of the carrier, decrease diameters of catalyst elements and highly disperse the catalyst elements. However, if simply increasing the amount of the materials of high specific surface areas like active alumina, it is the thickness of the active alumina layer only that is increased, and it does not lead to an increase of the contact probability, but results in a pressure loss. For this reason, modifications have been made on cell shapes, cell densities, wall thicknesses, and so on. For example, see JP-A 10-263416 (below, referred to as "reference 1").

On the other hand, a honeycomb structure formed from materials of high specific surface areas is known to be formed by extrusion molding of the materials of high specific surface areas together with inorganic fibers and inorganic binders. For example, see JP-A 5-213681 (below, referred to as "reference 2").

Further, a honeycomb structure is known, which is obtained by extrusion molding of the materials of high specific surface areas and having a catalyst being carried by the materials. In the honeycomb structure, the thickness of a partition wall (referred to as wall thickness, below) between through-holes, the length along a gas flowing direction, the length of one side of the through-holes, and an open area ratio are adjusted to be preset values. For example, see JP-A 2003-245547 (below, referred to as "reference 3").

Additionally, the entire contents of JP-A 10-263416, JP-A 5-213681, and JP-A 2003-245547 are hereby incorporated by reference.

SUMMARY OF THE INVENTION

An embodiment of the present invention provides a honeycomb structure including a plurality of through-holes separated by a plurality of partition walls and provided in parallel along a longitudinal direction, wherein a thickness of each of the partition walls is less than or equal to about 0.25 mm, a length of each of the through-holes is equal to or greater than about 50-fold of a hydraulic diameter of each of the through-holes and less than or equal to about 350-fold of the hydraulic diameter of each of the through-holes, and an open area ratio (X) % of a cross section of the honeycomb structure perpendicular to the through-holes and a surface area per unit volume (Y ($m^2$/L)) satisfy:

$Y \geq 250 \times X + 22500$ (about $50 \leq X \leq$ about 85).

In addition, in the honeycomb structure, preferably the thickness of each of the partition walls is equal to or greater than about 0.10 mm.

In addition, in the honeycomb structure, preferably the honeycomb structure is formed from a mixture of ceramic particles and an inorganic binder.

In addition, in the honeycomb structure, preferably as solid concentrations, the mixture includes ceramic particles from about 30% to about 90% in weight, and the inorganic binder from about 5% to about 50% in weight.

In addition, in the honeycomb structure, preferably the surface area per unit volume is greater than or equal to about 35000 $m^2$/L and less than or equal to about 70000 $m^2$/L.

Another embodiment of the present invention provides a honeycomb structure aggregate, comprising a plurality of the honeycomb structures as described above, and the honeycomb structures are bonded together by sealing material layers.

In addition, in the honeycomb structure aggregate, preferably a thickness of each of the sealing material layers is greater than or equal to about 0.5 mm and less than or equal to about 2 mm.

Another embodiment of the present invention provides a honeycomb catalyst, comprising the honeycomb structure with a catalyst being carried by the honeycomb structure.

Another embodiment of the present invention provides a honeycomb catalyst, comprising the honeycomb structure aggregate with a catalyst being carried by the honeycomb structure aggregate.

In addition, in the honeycomb structure aggregate, preferably the catalyst includes one or more selected from a group of a noble metal, an alkali metal, an alkali-earth metal, and an oxide.

In addition, preferably, the honeycomb catalyst is used to convert exhaust gas from a vehicle.

These and other objects, features, and advantages of the present invention will become more apparent from the following detailed description of preferred embodiments given with reference to the accompanying drawings.

DESCRIPTION OF THE PREFERRED EMBODIMENTS

Below, embodiments of the present invention are explained with reference to the accompanying drawings.

Figure 1A:
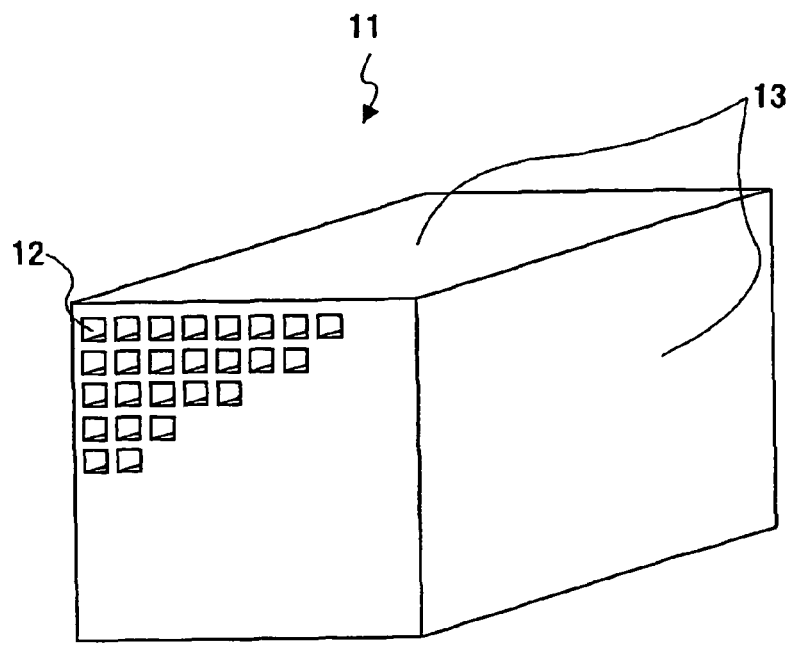
FIG. 1A is a schematic view of a honeycomb structure of the present invention.

As illustrated in FIG. 1A, a honeycomb structure 11 of the present invention includes plural through-holes 12 separated by partition walls 15 and arranged in parallel along a longitudinal direction, and the thickness of each of the partition walls (below, simply referred to as wall thickness) is less than or equal to about 0.25 mm, the length of each of the through-holes 12 is equal to or greater than about 50-fold of the hydraulic diameter of each of the through-holes 12 and less than or equal to about 350-fold of the hydraulic diameter of each of the through-holes 12, and an open area ratio (X) % of a cross section of the honeycomb structure perpendicular to the through-holes 12 and a surface area per unit volume (Y (m²/L)) satisfy:

$$Y \geq 250 \times X + 22500 \text{ (about } 50 \leq X \leq \text{about } 85) \quad (1)$$

With these conditions, it is possible to attain sufficient contact between catalyst elements and exhaust gas and efficiently convert the exhaust gas.

The reason of this finding is not clear. The inventors, however, attempt to explain this finding in the following way. As described above, generally, in this type of honeycomb structure, it is necessary to increase the contact probability between the exhaust gas and catalyst elements carried by the honeycomb structure. For this purpose, it is effective to increase the specific surface area of the honeycomb structure, decrease diameters of catalyst elements being carried and highly disperse the catalyst elements. With the catalyst elements being highly dispersed, the specific surface area of the catalyst elements is increased; due to this, even when the amount of the catalyst elements being carried is the same, it is probable that the contact probability between the exhaust gas and the catalyst elements is increased.

In the honeycomb structure, because the exhaust gas flows into the inner portion of the through-holes along the surface of the partition wall, although the exhaust gas infiltrates into the partition wall by diffusion, the distance to the surface of the partition wall, which surface allows contact with the catalyst elements, is limited. Due to this, it is thought that if the wall thickness is less than about 0.25 mm, the amount of the catalyst elements carried in the inner portion of the partition wall decreases, where the catalyst elements and the exhaust gas cannot contact each other, so that there is no contribution to conversion. As a result, it is easy to efficiently convert the exhaust gas.

In addition, it is believed that if the length of the through-holes 12 is greater than or equal to about 50-fold of the hydraulic diameter of the through-holes 12, the exhaust gas flowing through without contacting the catalyst elements can hardly occur, and degradation of conversion capability does not happen, and further, degradation of the strength of the honeycomb structure does not happen. In the meantime, it is believed that if the length of the through-holes 12 is less than or equal to about 350-fold of the hydraulic diameter of the through-holes 12, the flow rate of the exhaust gas does not increase along with an increase of the pressure loss when the exhaust gas flows through the through-holes 12 of the honeycomb structure 11. The contact probability with the catalyst elements is not decreased, and degradation of conversion capability does not occur.

Thus, it is preferable that the length of the through-holes 12 be equal to or greater than about 50-fold of the hydraulic diameter of the through-holes 12 and less than or equal to about 350-fold of the hydraulic diameter of the through-holes 12. More preferably, the length of the through-holes 12 is equal to or greater than about 50-fold of the hydraulic diameter of the through-holes 12 and less than or equal to about 250-fold of the hydraulic diameter of the through-holes 12.

Note that the hydraulic diameter of the through-holes 12 is obtained by dividing four-fold of the area of the cross section of the honeycomb structure 11 perpendicular to the through-hole 12 by the circumferential length of the through-hole 12.

In addition, when the open area ratio (X) % increases, the partition walls 15 of the honeycomb structure 11 for carrying the catalyst elements become thin. Because it is necessary to increase the speed of absorbing the exhaust gas by the catalyst elements, for this purpose it is effective to increase the specific surface area Y of the honeycomb structure. Therefore, in order to increase the contact probability between the exhaust gas and the catalyst elements carried by the honeycomb structure, and efficiently convert the exhaust gas, it is necessary to define the open area ratio (X) % and the specific surface area Y (surface area per unit volume) to be in an appropriate range. Inventors of the present invention found that when equation (1) is satisfied, it is possible to attain sufficient contact between the catalyst elements and the exhaust gas and to efficiently convert the exhaust gas.

If the open area ratio X is less than about 85%, the exhaust gas flows through while contacting the catalyst elements, thus, degradation of conversion capability does not occur, and further, degradation of the strength of the honeycomb structure does not occur. In the meantime, if the open area ratio X is greater than about 50%, the flow rate does not increase along with an increase of the pressure loss when the exhaust gas flows through the through-holes 12 of the honeycomb structure 11, and the contact probability with the catalyst elements is not decreased and degradation of conversion capability does not occur.

It is preferable that the honeycomb structure of the present invention be formed from a mixture of ceramic particles and an inorganic binder. More preferably, the honeycomb structure of the present invention is formed from a mixture of the ceramic particles and an inorganic reinforcement material. Due to this, the ceramic particles, acting as a base of the catalyst carrier, can be consolidated, and be used as a honeycomb structure having strength sufficient for maintaining at least the shape and having a high specific surface area. In addition, by including the inorganic reinforcement material, the strength can be further increased. In addition, as the catalyst elements are dispersed broadly in the whole honeycomb structure and are carried, even when the ceramic particles are not sufficiently fired for purposes of maintaining a high specific surface area, it becomes possible to maintain the shape even when thermal shock and vibration are imposed.

Figure 1B:
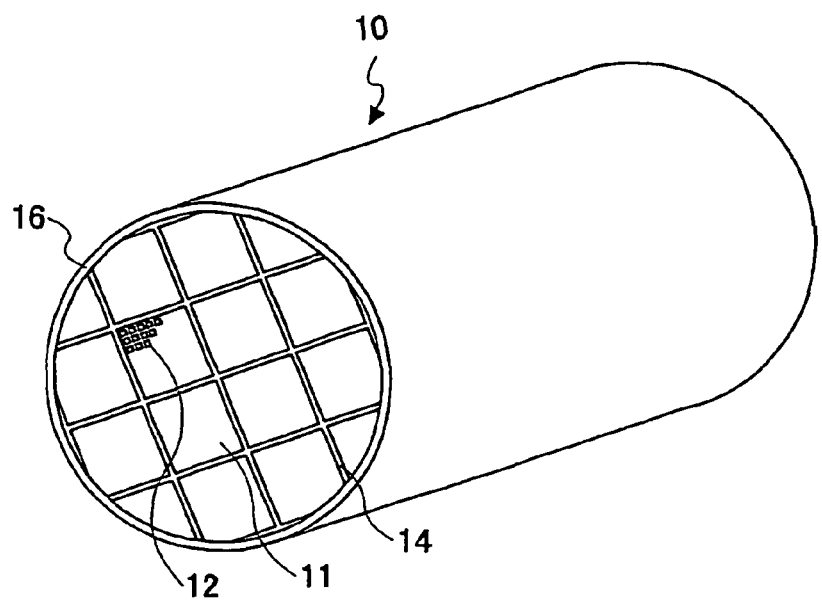
FIG. 1B is a schematic view of a honeycomb structure aggregate of the present invention.

As illustrated in FIG. 1B, a honeycomb structure aggregate of the present invention includes plural honeycomb structures 11 as described above, which are bonded together by sealing material layers 14 at outer side walls 13. In such a honeycomb structure aggregate, the high specific surface area can be increased, and the catalyst elements can be dispersed broadly, and further, the strength against thermal shock and vibration can be increased.

It is thought that this is because even when a temperature distribution is generated in the honeycomb structure aggregate due to a rapid temperature change, the difference of temperatures of individual honeycomb structure can be reduced to be small; alternatively, this is because the thermal shock and the vibration can be attenuated by the sealing material layers 14.

In addition, even when cracks occur in the honeycomb structure because of thermal stress, the sealing material layers 14 are able to prevent the cracks from propagating throughout the whole honeycomb structure. Further, the sealing material layers 14 also function as a frame of the honeycomb structure to maintain the shape of the honeycomb structure aggregate so as not to lose the function of a catalyst carrier.

There is no limitation on the ceramic particles. For example, it is preferable to use one or more selected from a group of alumina, silica, zirconia, titanium, cerium, mullite, and zeolite. It is more preferable to use alumina.

Preferably, the concentration of the ceramic particles included in the honeycomb structure is from about 30% to about 90% in weight, more preferably, from about 40% to about 80% in weight, and still more preferably, from about 50% to about 70% in weight. When the concentration of the ceramic particles is greater than about 30% in weight, the percentage of the ceramic particles, which contribute to the specific surface area, is large, and the specific surface area of the honeycomb structure does not decrease; as a result, when carrying the catalyst elements, the catalyst elements can be well dispersed. Meanwhile, when the concentration of the ceramic particles is lower than about 90% in weight, the percentage of the inorganic reinforcement materials and inorganic binders, which contribute to the strength, is large; as a result, the strength of the honeycomb structure does not decrease.

There is no limitation on the inorganic reinforcement materials. For example, inorganic fibers and/or whisker, inorganic particles, and others can be used. Preferably, the inorganic fibers and/or whisker may be one or more selected from a group of alumina, silica, silicon carbide, silica alumina, glasses, potassium titanate, and aluminum borate. The inorganic particles may be one or more selected from a group of alumina, silica, zirconia, silicon carbide, and silicon nitride.

Preferably, the concentration of the inorganic reinforcement materials included in the honeycomb structure is from about 3% to about 50% in weight, more preferably, from about 5% to about 40% in weight, and still more preferably, from about 8% to about 30% in weight. When the concentration of the inorganic reinforcement materials is greater than about 3% in weight, the percentage of the inorganic reinforcement materials, which materials contribute to the strength, is large; hence, the strength of the honeycomb structure increases. When the concentration of the inorganic reinforcement materials is less than about 50% in weight, the percentage of the ceramic particles, which particles contribute to the specific surface area, is large, and the specific surface area of the honeycomb structure does not decrease; as a result, when carrying the catalyst elements, the catalyst elements can be well dispersed.

Preferably, the aspect ratio (length/width) of the inorganic fibers and/or whiskers is from about 2 to about 1000, more preferably, from about 5 to about 800, still more preferably, from about 10 to about 500. When the aspect ratio of the inorganic fibers and/or whisker is greater than about 2, the contribution to the strength of the honeycomb structure is large; when the aspect ratio of the inorganic fibers and/or whisker is less than about 1000, during molding, clogging can hardly occur in the mold, and it is easy to perform molding.

There is no limitation on the inorganic binders. For example, one or more selected from a group of alumina sol, silica sol, titanium sol, soluble glass, sepiolite, and attapulgite may be used.

Preferably, the concentration of the inorganic binders included in the honeycomb structure is from about 5% to about 50% in weight, more preferably, from about 10% to about 40% in weight, and still more preferably, from about 15% to about 35% in weight. When the concentration of the inorganic binders is greater than about 5% in weight, the strength of the honeycomb structure does not decrease; when the concentration of the inorganic binders is greater than about 50% in weight, it is easy to perform molding.

There is no limitation on the shape of the honeycomb structure. It is preferable to use shapes facilitating binding of the honeycomb structures. For example, a cross section of the honeycomb structure perpendicular to the through-holes (below, referred to as "honeycomb cross section") may be a square, or rectangle, or a sector. As an example of the honeycomb structure, FIG. 1A illustrates the honeycomb structure 11, which is a rectangular solid having a square honeycomb cross section. The honeycomb structure 11 includes plural through-holes 12 arranged in parallel from the front side to the back side, and the outer side walls 13 without through-holes. Preferably, the area of the cross section of the honeycomb structure 11 perpendicular to the through-holes 12 (below, referred to as "honeycomb cross section") is from about 5 to about 50 $cm^2$, more preferably, from about 6 to about 40 $cm^2$, and still more preferably, from about 8 to about 30 $cm^2$. When the area of the honeycomb cross section is greater than about 5 $cm^2$, the cross-sectional area of the sealing material layers 14, which seal the honeycomb structures 11, is relatively small, the pressure loss does not increase, and in addition, the specific surface area becomes large. In the meantime, when the area of the honeycomb cross section is less than about 50 $cm^2$, the honeycomb structures 11 is small, thus, it is easy to reduce the thermal stress in each of the honeycomb structures 11.

The open area ratio is defined to be a ratio of a sum of areas of the through-holes 12 of the honeycomb structure to the honeycomb cross section.

In the present invention, preferably, the wall thickness between the through-holes 12 is less than or equal to about 0.25 mm, more preferably, less than or equal to about 0.22 mm, and still more preferably, less than or equal to about 0.20 mm. Below about 0.22 mm the catalyst being carried can be utilized more efficiently. When the wall thickness between the through-holes 12 is less than about 0.10 mm, the strength of the honeycomb structure becomes lessened, hence, it is preferable that the wall thickness be greater than or equal to about 0.10 mm.

In addition, it is preferable that the number of the through-holes 12 per unit cross-sectional area be from about 15.5 to about 186/$cm^2$ (from about 100 to about 1200 cpsi), more preferably, from about 46.5 to about 170.5/$cm^2$ (from about 300 to about 1100 cpsi), and still more preferably, from about 62.0 to about 155/$cm^2$ (from about 400 to about 1000 cpsi). When the number of the through-holes 12 per unit cross-sectional area is greater than about 15.5, the area of the inner wall contacting the exhaust gas in the honeycomb structures 11 is large, and when the number of the through-holes 12 per unit cross-sectional area is less than about 186, the pressure loss does not increase, and it is easy to fabricate the honeycomb structures 11.

According to the present embodiment, it is possible to increase the specific surface-area of the carrier, decrease diameters of catalyst elements and highly disperse the catalyst elements, and thus it is possible to increase the contact probability between the exhaust gas and the catalyst element and the NOx occlusion agent, and to further improve conversion performance.

In addition, it is possible to easily increase the contact probability between the exhaust gas and the catalyst elements, thus it is possible to convert the exhaust gas efficiently.

Next, descriptions are made of a method of fabricating the honeycomb structure of the present invention. First, extrusion molding is performed by using a raw material paste with the above-mentioned ceramic particles and inorganic binders as main ingredients, thereby forming a honeycomb molding piece. It is more preferable to use a raw material paste with the ceramic particles, the inorganic reinforcement materials, and the inorganic binders as main ingredients. In the raw material paste, in addition to the above materials, an organic binder, a dispersive medium, and a molding agent may be added when necessary according to the moldability.

There is no limitation on the organic binders. For example, the organic binders may be one or more selected from a group of methylcellulose, carboxymethylcellulose, hydroxyethylcellulose, polyethylene glycol, phenolic resin, and epoxy resin. Preferably, the composition of the organic binders is about 1 to about 10 parts by weight (w/t part) assuming the total weight of the ceramic particles and the inorganic binders is 100 parts by weight (w/t part). When the raw material paste includes the inorganic reinforcement materials, preferably, the loading of the organic binders is about 1 to about 10 parts by weight (w/t part) assuming the total weight of the ceramic particles, the inorganic reinforcement materials, and the inorganic binders is 100 parts by weight (w/t part).

There is no limitation on the dispersive medium. For example, the dispersive medium may be water, organic solvent (like benzene), alcohol (like methanol), or others.

There is no limitation on the molding agent; for example, the molding agent may be ethylene glycol, dextrin, aliphatic acid, fatty acid soap, polyalcohol, or others.

There is no limitation on the method of forming the raw material paste. For example, mixing and kneading are preferable. For example, a mixer or an agitator may be used for mixing, and a kneader may be used for kneading.

There is no limitation on the method of molding the raw material paste. For example, a shape having the through holes can be formed by extrusion molding.

Next, preferably, the thus obtained molding piece is dried. Any kind of dryer can be used, for example, use can be made of a microwave dryer, a hot air dryer, a dielectric dryer, a low-pressure dryer, a vacuum dryer, or a freezing dryer. In addition, preferably, the thus obtained molding piece is degreased. There is no limitation on conditions of degreasing, but the degreasing conditions can be selected appropriately according to the types and amounts of organic materials included in the molding piece. Preferably, degreasing is performed at a temperature of about 400° C. for about two hours. Preferably, the thus obtained molding piece is fired. There is no limitation on conditions of firing. Preferably, firing is performed at a temperature from about 600° C. to about 1000° C. If the firing temperature is higher than about 600° C., firing of the ceramic particles can proceed easily, and the strength of the honeycomb structure does not decrease. If the firing temperature is lower than about 1000° C., the ceramic particles are not sintered too much, the specific surface area increases, and the catalyst elements being carried can be highly dispersed.

Through the above steps, the honeycomb structure having plural through-holes can be formed.

Next, a sealing material, which becomes the sealing material layers 14, is applied on the thus obtained honeycomb structure, and plural such honeycomb structures are bonded one by one, and are dried and fixed afterwards to fabricate a honeycomb structure aggregate.

There is no limitation on the sealing material. For example, the sealing material may be a mixture of ceramic particles and an inorganic binder, or a mixture of an inorganic binder and an inorganic reinforcement material, or a mixture of ceramic particles, an inorganic binder, and an inorganic reinforcement material. Further, an organic binder can be added to the sealing material. There is no limitation on the organic binder. For example, the organic binder may be one or more selected from a group of polyvinyl alcohol, methylcellulose, ethylcellulose, and carboxymethylcellulose.

It is preferably that the sealing material be about 0.5 to about 2 mm in thickness. If the thickness of the sealing material is greater than about 0.5 mm, it is easy to obtain sufficient bonding strength. Meanwhile, because the sealing material does not function as a catalyst carrier, if the thickness of the sealing material is less than about 2 mm, the specific surface area increases, and when catalyst elements are being carried, the catalyst elements can be well dispersed. The number of the bonded honeycomb structures can be appropriately decided according to the size of the honeycomb structure aggregate in use, which includes the bonded honeycomb structures carrying the catalyst elements. The honeycomb structure aggregate can be appropriately cut or polished according to its size and shape in use.

A coating material is applied to the outside surface (side surfaces) of the honeycomb structure aggregate, on which the through-holes are not formed, and dried and fixed afterward to form a coating material layer. Due to this, it is possible to protect the outside surface and increase the strength.

There is no limitation on the coating material. It may be formed from the same material as the sealing material, or from materials different from the sealing material. In addition, the composition of the coating material may be the same as that of the sealing material, or different from that of the sealing material.

There is no limitation on the thickness of the coating material. Preferably, the coating material is about 0.1 to about 2 mm in thickness. If the thickness of the coating material is less than about 0.1 mm, it is difficult to sufficiently protect the outside surface and increase the strength. Meanwhile, if the thickness of the coating material is less than about 2 mm, the specific surface area of the honeycomb structure aggregate does not decrease, and when catalyst elements are being carried, the catalyst elements can be well dispersed.

In addition, preferably, the ratio of the sum of the cross-sectional areas of the honeycomb structures in a cross section perpendicular to the longitudinal direction to the cross-sectional area of the honeycomb structure aggregate in the cross section perpendicular to the longitudinal direction is greater than or equal to about 85%, and more preferably, the ratio is greater than or equal to about 90%. If the ratio is greater than about 85%, the proportion of the honeycomb structures increases, thus the specific surface area of the honeycomb structure aggregate increases.

After plural honeycomb structures are bonded with the sealing materials (when the coating materials are provided, after the coating material layers are formed), it is preferable to perform calcination. In doing so, it is possible to perform degreasing when the organic binder is included in the sealing materials and the coating materials. The degreasing conditions may be determined appropriately according to types and loadings of the organic materials. Preferably, calcination is performed at about 700° C. for about two hours. As an example of the honeycomb structure aggregate, FIG. 1B is a schematic view of a cylindrical honeycomb structure aggregate 10 which is obtained by bonding plural solid rectangular honeycomb structures 11 (refer to FIG. 1A) each having a square cross section. To form the honeycomb structure aggregate 10, the honeycomb structures 11 are bonded together by the sealing material layers 14, and are cut into a cylindrical shape. Then, the outer surface of the honeycomb structure aggregate 10 without through-holes is covered by a coating material layer 16. Alternatively, the honeycomb structure aggregate 10 shown in FIG. 1B, for example, may be fabricated by shaping the cross sections of the honeycomb structures into a square or a sector, and bonding these honeycomb structures 11 together to form a certain shape (in FIG. 1B, a cylinder). In doing so, cutting and polishing steps may be omitted.

There is no limitation on applications of the thus obtained honeycomb structure aggregate 10 (or the honeycomb structures 11). For example, it is preferable to use the honeycomb structure aggregate 10 as a catalyst carrier for converting exhaust gas from vehicles. In addition, when the honeycomb structure aggregate 10 is used as a catalyst carrier for converting exhaust gas from a Diesel engine, it may be used together with a Diesel particulate filter (DPF), which includes silicon carbide or other ceramic honeycomb structures to filter particulate materials (PM) in the exhaust gas, and has combustion purification functions. In this case, the honeycomb structure aggregate 10 of the present invention may be arranged in front (upstream) of or behind (downstream of) the DPF. When the honeycomb structure aggregate 10 is arranged in front of the DPF, if exothermic reactions occur in the honeycomb structure aggregate 10 of the present invention, heat can be transmitted to the DPF behind, causing rise of the temperature during regeneration of the DPF. In the meantime, when the honeycomb structure aggregate 10 is arranged behind the DPF, since the PM in the exhaust gas is filtered (burned) by the DPF so as to pass through the through-holes of the honeycomb structure aggregate, clogging can hardly occur. Further, when burning the PM by the DPF, gas compositions generated by incomplete combustion can also be processed.

The thus obtained honeycomb structure aggregate 10 (or the honeycomb structures 11) can carry a catalyst to form a honeycomb catalyst. There is no limitation on the catalyst. For example, the catalyst may include one or more of a noble metal, an alkali metal, an alkali-earth metal, and an oxide. For example, the noble metal may be platinum, palladium, rhodium, or others. The alkali metal may be potassium, sodium, or others. The alkali-earth metal may be barium or others. The oxide may be perovskite (such as, $La_{0.75}K_{0.25}MnO_3$), $CeO_2$, or others.

There is no limitation on applications of the thus obtained honeycomb catalyst. For example, it is preferable to use the honeycomb catalyst as a three way catalyst or an occlusion-type NOx catalyst.

There is no limitation on the way of carrying the catalyst. The catalyst may be carried after the honeycomb structure is fabricated, or may be carried at the stage of raw materials.

As for the honeycomb structure aggregate, the honeycomb structure aggregate may be formed after the catalyst is carried by the honeycomb structure, or the honeycomb structure aggregate may be formed first, then the catalyst is carried by the honeycomb structure.

There is no limitation on the method of having the catalyst being carried. For example, impregnation may be used.

Figure 2:
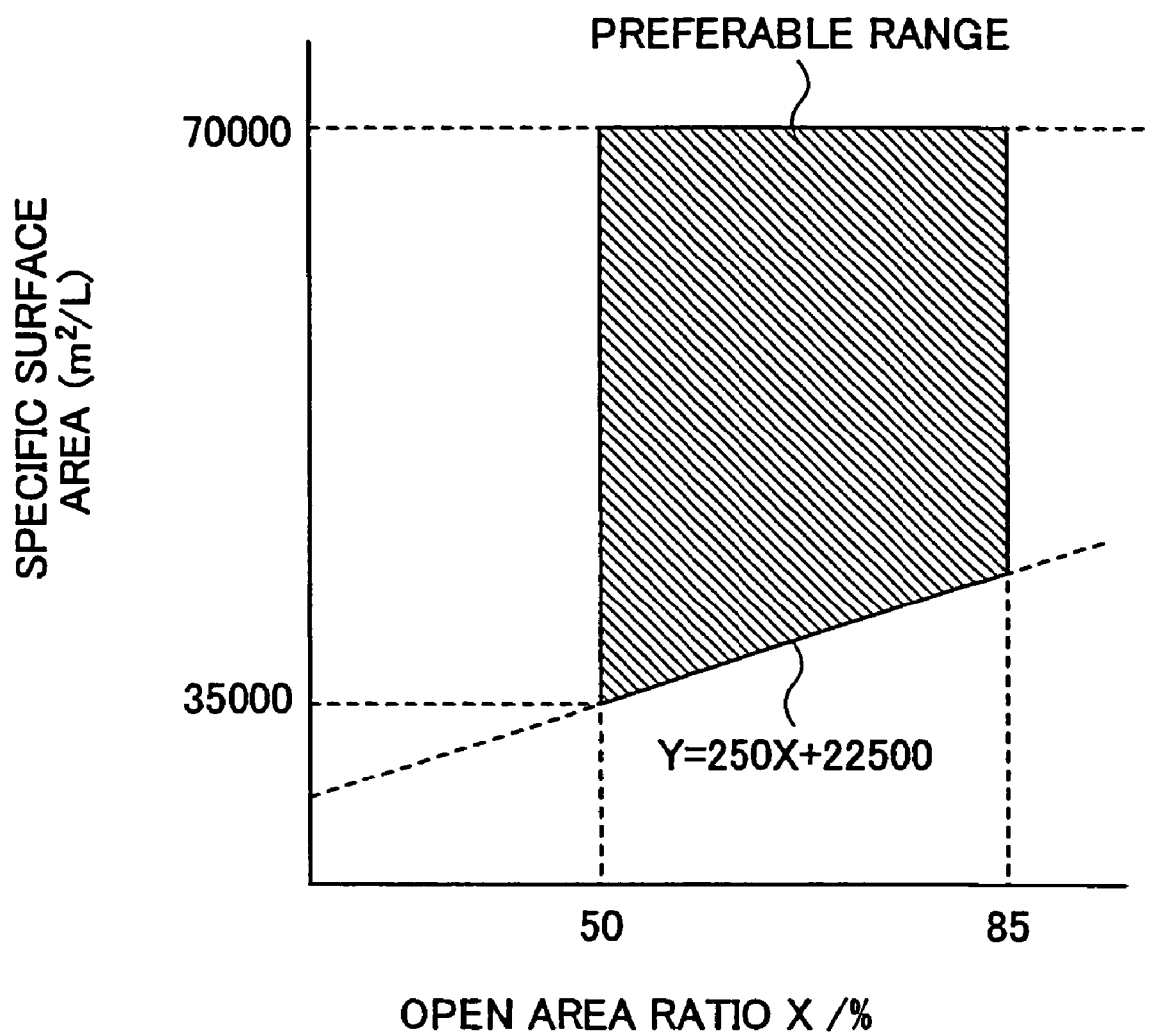
FIG. 2 illustrates a preferable range of an open area ratio and a specific surface area.

In the honeycomb structure, preferably the specific surface area is greater than or equal to about 35,000 $m^2/L$. Due to this, it is possible to have the catalyst being carried with the catalyst elements being broadly dispersed all over the honeycomb structure. In the meantime, it is preferable that the specific surface area be less than or equal to about 70,000 $m^2/L$. FIG. 2 illustrates a preferable range of the open area ratio of the honeycomb structure and the specific surface area. The specific surface area is calculated by using equation (2) as explained below.

Next, an explanation is made of the specific surface area. First, the volume of the materials constituting the portion of the honeycomb structure except for the volume of the through-holes is calculated, and a calculation is made of a ratio A (volume %) of the materials constituting the portion of the honeycomb structure except for the volume of the through-holes to the volume (outline shape) of the honeycomb structure. Next, a measurement is made of a BET specific surface area per unit weight of the honeycomb structure ($m^2/g$) (denoted as "B"). The BET specific surface area is measured by "one-point method" in compliance with JIS-R-1626 (1996) set forth in the Japanese Industrial Standards. Here, the measurement is made by cutting out cylindrical slices (diameter: 15 mm, length: 15 mm). Then, the apparent density C (g/L) of the honeycomb structure is calculated from the weight of the honeycomb structure and the volume corresponding to the outline shape of the honeycomb structure. The specific surface area S ($m^2/L$) of the honeycomb structure can be calculated by the following equation (2).

$$S = A/100 \times B \times C \qquad (2)$$

Here, the specific surface area is the surface area per unit apparent volume of the honeycomb structure.

Additionally, the entire contents of JIS-R-1626 (1996) are hereby incorporated by reference.

The specific surface area of the honeycomb structure may be changed by appropriately changing the firing temperature and the firing time. For example, if the firing temperature is lowered, sintering of the materials constituting the honeycomb structure cannot proceed easily, and it is possible to fabricate a honeycomb structure having a high specific surface area. On the other hand, if the firing temperature is raised, sintering of the materials constituting the honeycomb structure develops easily, it is possible to fabricate a honeycomb structure having a small specific surface area. If the firing time is additionally increased, a more significant effect can be obtained. In addition, since when the raw materials of the honeycomb structure have small particle diameters, the sintering of the materials also develops easily even at the same firing temperature, so that the specific surface area of the honeycomb structure may be adjusted by adjusting the particle diameters of the raw materials. Further, when a firing aid is added, the effect becomes more significant; thereby, the specific surface area of the honeycomb structure can be adjusted.

There is no limitation on the firing aid. For example, the firing aid may be a material which is melted at a temperature lower than the firing temperature of the honeycomb structure.

Below, examples of the honeycomb catalyst including catalyst elements carried by the honeycomb structure fabricated under various conditions are explained, together with comparative examples.

EXAMPLE 1

First, γ alumina particles (having average particle diameter of 2 μm) in 40 parts by weight, serving as the ceramic particles, silica alumina fibers (having average fiber diameter of 10 μm and average fiber length of 100 μm) in 10 parts by weight, serving as the inorganic fibers, and silica sol (solid concentration 30 weight %) in 50 parts by weight, serving as the raw materials of the inorganic binder, are mixed. Further, methylcellulose in 6 parts by weight and tiny amounts of plasticizer and lubricant are added into the thus obtained mixture in 100 parts by weight, and are further mixed and kneaded, forming a mixture composition. Then, this mixture composition is extruded by using an extruder to perform extrusion molding, obtaining a raw molding piece.

Figure 3:
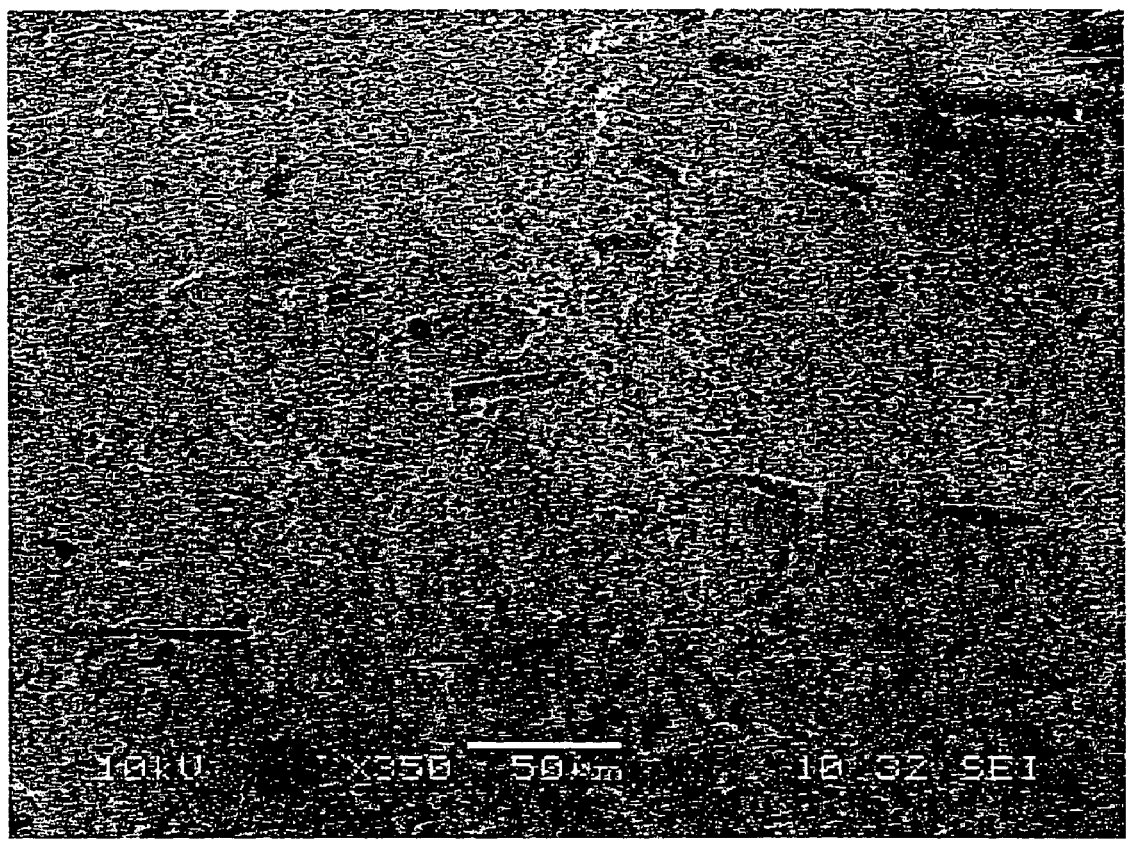
FIG. 3 is a SEM (Scanning Electron Microscopy) picture of a wall surface of the honeycomb structure of the present invention.

A microwave dryer and a hot air dryer are used to adequately dry the raw molding piece, and then the raw molding piece is maintained at 400° C. for two hours for degreasing. Afterward, the raw molding piece is maintained at 800° C. for two hours for firing. In this way, a honeycomb structure is obtained which is in a square-pillar shape (34.3 mm×34.3 mm×150 mm), has a cell density of 62/cm$^2$ (400 cpsi), and a wall thickness of 0.25 mm. FIG. 3 presents a SEM (Scanning Electron Microscopy) picture of the wall surface of the honeycomb structure.

Next, the thus obtained honeycomb structure is immersed in a platinum nitrate solution, and adjustment is made so that the platinum is carried by the honeycomb structure with the weight of platinum per unit volume of the honeycomb structure being 2 g/L. Then, this composition is maintained at 600° C. for one hour, thereby obtaining a honeycomb catalyst with catalyst elements being carried.

Table 1 summarizes the ceramic particles in the honeycomb catalyst, the wall thickness, the open area ratio X, the shape of the honeycomb structure, the cell density, the length L of the through-holes, the hydraulic diameter d of the through-holes, L/d, the firing temperature, and the firing time.

EXAMPLE 2-16 AND COMPARATIVE EXAMPLES 1-17

Using starting materials having the same composition as those in the first example, the same steps were executed as in the first example under conditions as shown in table 1, obtaining corresponding honeycomb structures. In the same way as in the first example, catalyst elements were arranged to be carried by those honeycomb structures, forming corresponding honeycomb catalysts.

COMPARATIVE EXAMPLE 18

A cylindrical cordierite honeycomb structure (diameter: 143.8 mm, length: 150 mm) available in the market, which has an alumina catalyst carrying layer inside the through-holes, was cut into square-pillar shapes (34.3 mm×34.3 mm×150 mm). Next, in the same way as in the first example, catalyst elements were arranged to be carried by the honeycomb structure, forming a honeycomb catalyst. Here, the cell shape was a hexagon, the wall thickness was 0.25 mm, the open area ratio was 56%, and the cell density was 62/cm$^2$ (400 cpsi).

Specific Surface Area Measurement

The specific surface area of the honeycomb structure before the catalyst elements were disposed was measured. First, the volume of the materials constituting the portion of the honeycomb structure except for the volume of the through-holes was calculated, and a calculation was made of a ratio A (volume %) of the materials constituting the portion of the honeycomb structure to the volume (outline shape) of the honeycomb structure. Next, a measurement was made of a BET specific surface area per unit weight of the honeycomb structure (m$^2$/g) (denoted as "B"). The BET specific surface area was measured by "one-point method" in compliance with JIS-R-1626 (1996) set forth in Japanese Industrial Standards by using a BET measurement device "Micrometitics" FlowSorb II-2300 (manufactured by Shimadzu Co.). In the measurement, samples were used which were obtained by cutting out cylindrical slices (diameter: 15 mm, length: 15 mm) from the honeycomb structure. Then, the apparent density C (g/L) of the honeycomb structure was calculated from the weight of the honeycomb structure and the volume corresponding to the outline shape of the honeycomb structure. The specific surface area S (m$^2$/L) of the honeycomb structure was calculated by using the above equation (2). It was found that the specific surface area of the honeycomb structure was approximately the same as the specific surface area of the honeycomb structure with catalyst elements disposed thereon.

Light-Off Temperature Test

Figure 4:
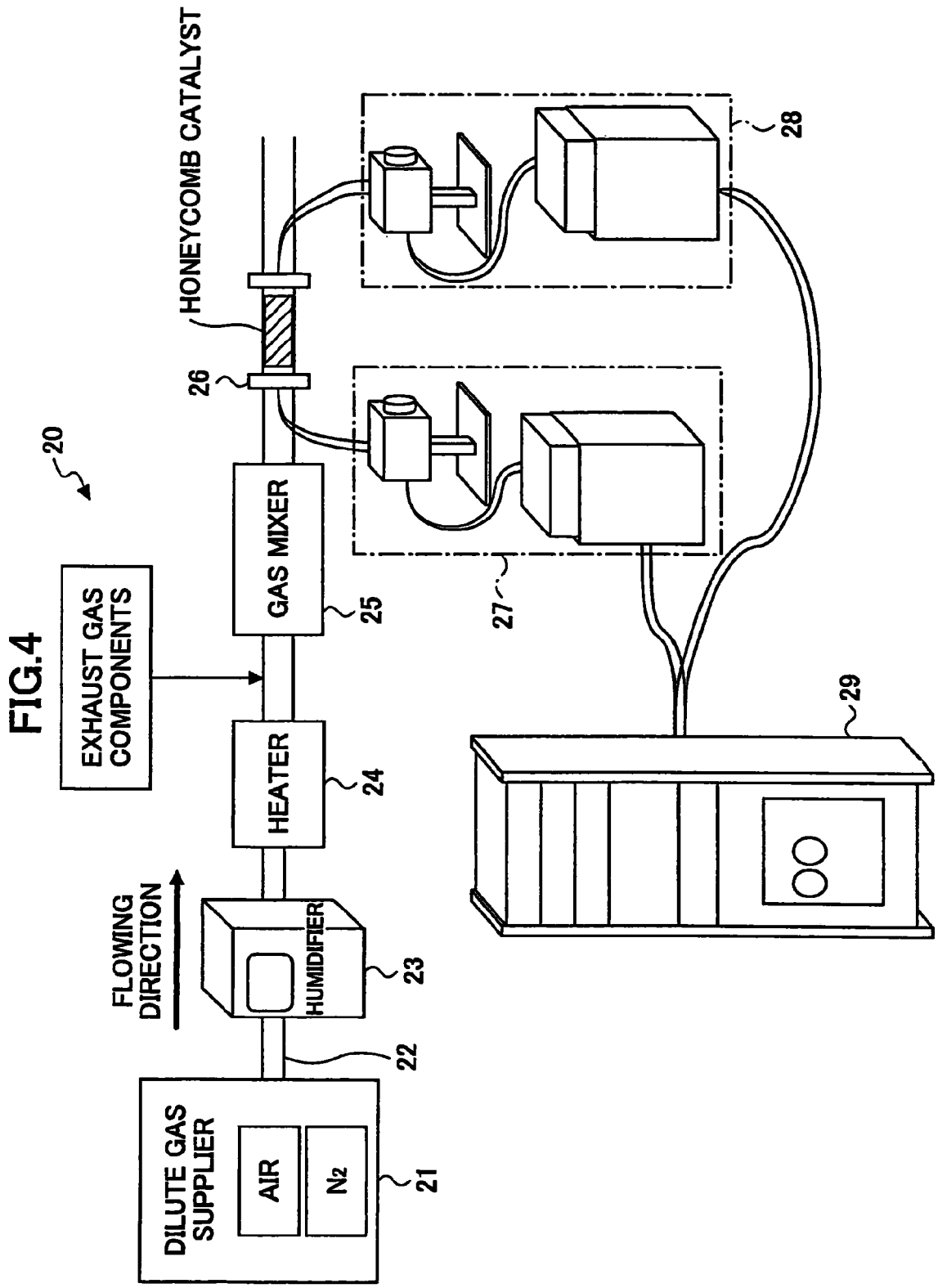
FIG. 4 illustrates a catalytic reaction device.

"Light-off temperature" is a reaction temperature when a conversion rate is 50%. Here, the conversion rate is defined to be a rate of reduction of a concentration of a specific component included in exhaust gas caused by a catalyst. When the light-off temperature is low, accordingly, the component in the exhaust gas can be converted without the necessity of imposing the corresponding portion of energy. Hence, a honeycomb catalyst having a low light-off temperature is of high catalytic performance. Therefore, the light-off temperature is used as an index indicating the catalytic performance of a honeycomb catalyst. Below, an explanation is made of a method of measuring the light-off temperature. This measurement can be made by using a catalytic reaction device 20 as shown in FIG. 4. The catalytic reaction device 20 has a supplier 21 of a dilute gas including air and nitrogen, a flowing channel 22 for the flow of the dilute gas to the honeycomb structure, a humidifier 23 for humidifying the dilute gas, a heater 24 for heating the dilute gas, a gas mixer 25 for mixing exhaust gas components into the heated dilute gas to prepare a reaction gas, an airtight sample holder 26 for holding the honeycomb structure, a gas sampler 27 for sampling the reaction gas before it contacts the honeycomb structure, and a gas analyzer 29 for analyzing concentration of a certain gas component included in the reaction gas.

Below, an explanation is made of a procedure for the measurement. First, the honeycomb catalyst was placed in the sample holder 26, and air and nitrogen were supplied to flow from the dilute gas supplier 21 to the flowing channel 22. Next, the dilute gas was humidified by the humidifier 23, and was adjusted to a preset temperature by the heater 24. Next, from the upstream side of the gas mixer 25, exhaust gas components were injected into the flowing dilute gas, and were mixed by the gas mixer 25 to prepare a reaction gas having a certain concentration. The prepared reaction gas was directed to flow to the honeycomb catalyst in the sample holder 26 to convert the reaction gas. In this process, the temperature of the heater 24 was appropriately adjusted, the temperatures of the reaction gas inside the honeycomb catalyst at different heater temperatures were measured by using a not-illustrated thermocouple, and the concentrations of the reaction gas sampled by the gas samplers 27, 28 were measured by the gas analyzer 29.

In the measurement of the light-off temperature, a honeycomb catalyst having a 34.3 mm×34.3 mm cross section and a length of 150 mm was used. The catalytic reaction was performed under conditions that the flow rate of the reaction gas was 131 L/minute; the exhaust gas components included oxygen, carbon oxides, sulfur dioxide, carbon hydrides, nitrogen oxides, water vapor, and nitrogen; in the reaction gas, the concentration of oxygen was 13%, the concentration of carbon oxides was 300 ppm, the concentration of sulfur dioxide was 8 ppm, the concentration of carbon hydrides based on the amount of carbon was 300 ppm, the concentration of nitrogen oxides was 160 ppm, and an amount of humidification was added more or less. In addition, the reaction temperature was adjusted by changing the temperature of the heater 24 10° C. each time in a range from 50 to 400° C. During this process, among the components included in the reaction gas, concentrations of the carbon oxides and carbon hydrides were measured by the gas analyzer 29.

With the concentration of the reaction gas components before contacting the honeycomb catalyst being C0, the concentration of the reaction gas components after contacting the honeycomb catalyst being Ci, the conversion rate (%) was calculated from equation (3).

$$\text{conversion rate} = (C0 - Ci)/C0 \times 100$$

After that, with the temperature of the reaction gas inside the honeycomb catalyst to be the reaction temperature, the relationship between the reaction temperature and the conversion rate was obtained. Then, a graph was plotted with the obtained reaction temperature as abscissa and the conversion rate as ordinate, and then the reaction temperature when the conversion rate was 50% was obtained from the graph, and this temperature was regarded as the "light-off temperature".

Evaluation Results

Figure 5A:
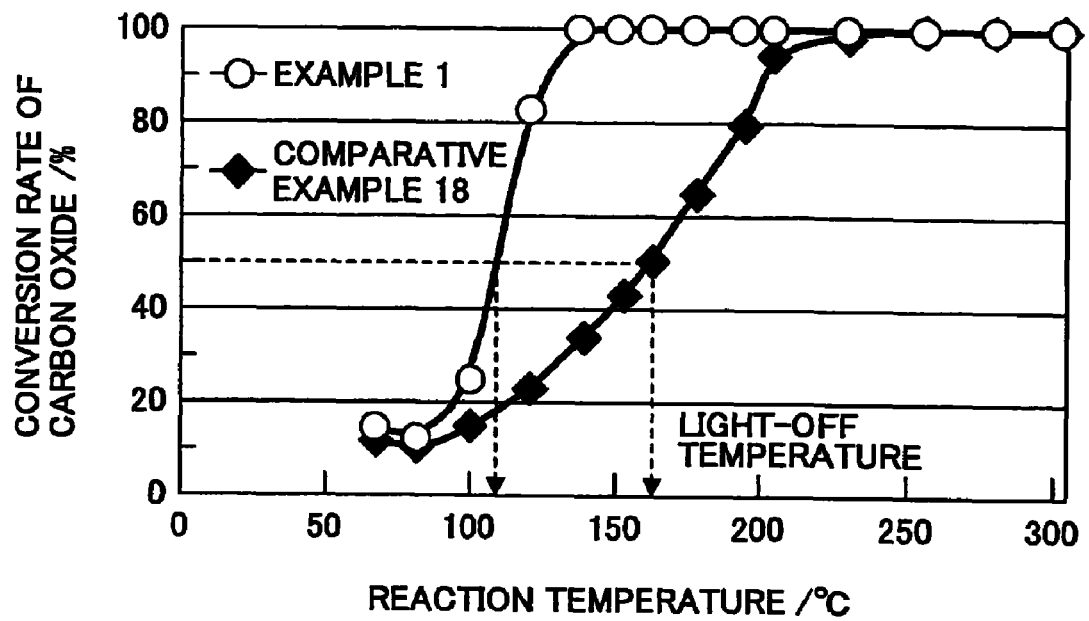
FIG. 5A illustrates a relationship between the reaction temperature and the conversion rate of carbon oxides (CO)

FIG. 5A presents measurement results expressing the relationship between the reaction temperature and the conversion rate of the carbon oxides (CO) in example 1 and comparative example 18.

Figure 5B:
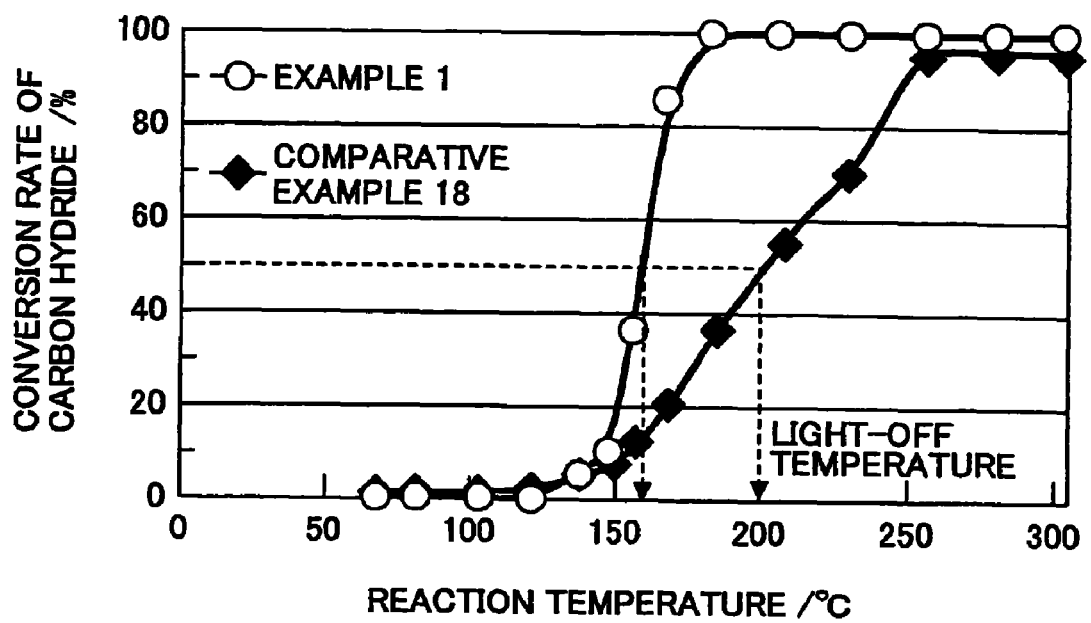
FIG. 5B illustrates a relationship between the reaction temperature and the conversion rate of carbon hydrides (CH)

FIG. 5B presents measurement results expressing the relationship between the reaction temperature and the conversion rate of the carbon hydrides (CH) in example 1 and comparative example 18.

As illustrated in FIG. 5A, in example 1, above a certain temperature, the conversion rate increases sharply, and at 140° C., the conversion rate reaches 100%. In contrast, in comparative example 18, a sharp increase of the conversion rate does not occur, and the temperature at which the conversion rate reaches 100% is higher than that in example 1.

As illustrated in FIG. 5B, carbon hydrides show the same trend. Therefore, since it is possible to convert (reduce) carbon oxides and carbon hydrides at a low temperature, this reveals that the catalytic performance in example 1 was high.

In FIG. 5A and FIG. 5B, the light-off temperatures were obtained as indicated by the dotted arrows. The light-off temperatures of other samples were obtained in the same way.

Table 2 summarizes the wall thickness, the open area ratio X, the specific surface area Y, the value of the formula 250X+ 2500, and the light-off temperature.

From these results, it is found that examples 1-16 are in the preferable range as shown in FIG. 2. Further, it is found that the honeycomb structure as described by equation (1) has high catalytic performance when the wall thickness is less than or equal to about 0.25 mm, and the length of the through-holes is equal to or greater than about 50-fold of a hydraulic diameter of each of the through-holes and less than or equal to about 350-fold of the hydraulic diameter of the through-holes.

Honeycomb Structure Aggregate

A heat-resistant sealing paste was prepared by mixing γ alumina particles (having average particle diameter of 2 μm) in 29 parts by weight, silica alumina fibers (having average fiber diameter of 10 μm, and average fiber length of 100 μm) in 7 parts by weight, silica sol (solid concentration 30 weight %) in 34 parts by weight, carboxymethylcellulose in 5 parts by weight, and water in 25 parts by weight. With this sealing paste, plural honeycomb structures before carrying the catalyst elements were bonded to fabricate a honeycomb structure aggregate.

Figure 6:
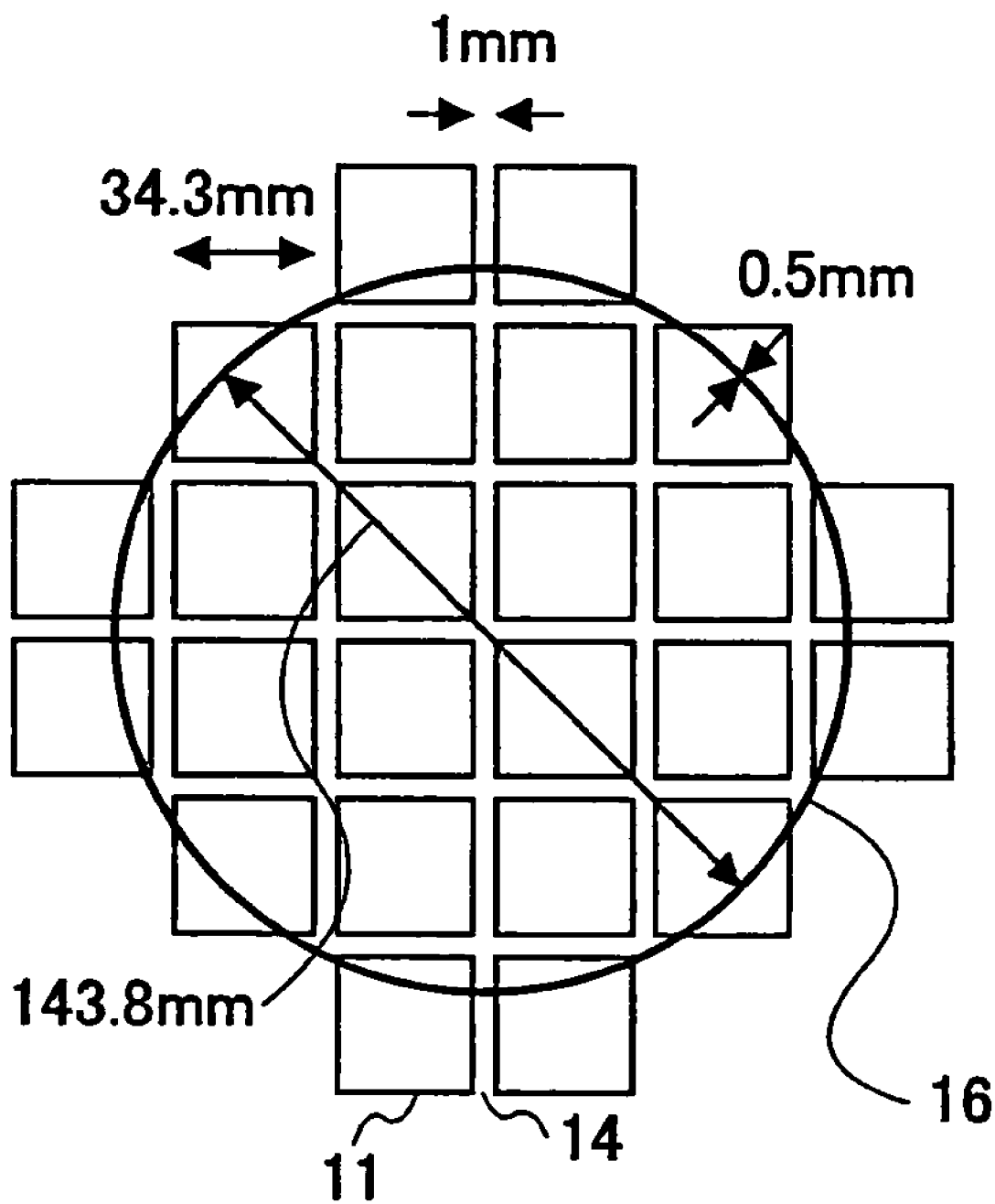
FIG. 6 illustrates a honeycomb structure aggregate of the present invention.

FIG. 6 is a schematic view of the honeycomb structure aggregate obtained by bonding plural honeycomb structures 11, showing a cross section of the honeycomb structure aggregate having the through-holes.

This honeycomb structure aggregate is fabricated by applying the sealing paste to the outside surface of the honeycomb structure aggregate to a thickness of 1 mm so as to bond the plural honeycomb structures 11. After the honeycomb structure aggregate was fabricated in this way, a diamond cutter was used to cut the honeycomb structure aggregate into circular cylindrical shape so that the front face of the aggregate was of point symmetry, and the sealing paste was applied to the circular outside surface 16 without the through-holes 12 to a thickness of 0.5 mm to form a coating on the outside surface 16. Then, the aggregate was dried at 120° C., and maintained at 700° C. for two hours to degrease the sealing material layer and the coating material layer, thereby obtaining a circular cylindrical honeycomb structure aggregate 10 (diameter: 143.8 mm, length: 150 mm) as shown in FIG. 1B. Then, in the same way as in the first example, catalyst elements were disposed to be carried by the honeycomb structure aggregate 10, forming a honeycomb structure aggregate with catalyst elements being carried thereon.

For example, the present invention can be used as a carrier of a catalyst for converting exhaust gas from a vehicle. In addition, the present invention can be used as an absorbent for absorbing gas components or liquid components.

While the invention has been described with reference to preferred embodiments, the invention is not limited to these embodiments, but numerous modifications could be made thereto without departing from the basic concept and scope described in the claims.

This patent application is based on international priority patent application PCT/JP2005/011663 filed on Jun. 24, 2005, the entire contents of which are hereby incorporated by reference.

TABLE 1

| sample | ceramic particles | wall thickness mm | X % | shape mm | cell density/ cm$^2$(cpsi) | L mm | D mm | L/d | firing temperature ° C. | firing time h |
|---|---|---|---|---|---|---|---|---|---|---|
| example 1 | alumina | 0.25 | 65 | 34.3 mm square | 62(400) | 150 | 1.02 | 147.1 | 800 | 2 |
| example 2 | alumina | 0.25 | 50 | 34.3 mm square | 140(900) | 150 | 0.60 | 252.0 | 900 | 5 |
| example 3 | alumina | 0.25 | 65 | 34.3 mm square | 62(400) | 150 | 1.02 | 147.1 | 900 | 3 |
| example 4 | alumina | 0.25 | 81 | 34.3 mm square | 15.5(100) | 150 | 2.29 | 65.5 | 800 | 2 |
| example 5 | alumina | 0.25 | 50 | 34.3 mm square | 140(900) | 150 | 0.60 | 252.0 | 700 | 1 |
| example 6 | alumina | 0.25 | 81 | 34.3 mm square | 15.5(100) | 150 | 2.29 | 65.5 | 600 | 1 |
| example 7 | alumina | 0.2 | 60 | 34.3 mm square | 124(800) | 150 | 0.70 | 214.9 | 800 | 2 |
| example 8 | alumina | 0.2 | 50 | 34.3 mm square | 217(1400) | 150 | 0.48 | 313.3 | 900 | 5 |
| example 9 | alumina | 0.2 | 60 | 34.3 mm square | 124(800) | 150 | 0.70 | 214.9 | 900 | 3 |
| example 10 | alumina | 0.2 | 82 | 34.3 mm square | 23.3(150) | 150 | 1.87 | 80.1 | 800 | 2 |
| example 11 | alumina | 0.2 | 50 | 34.3 mm square | 217(1400) | 150 | 0.48 | 313.3 | 700 | 1 |
| example 12 | alumina | 0.2 | 82 | 34.3 mm square | 23.3(150) | 150 | 1.87 | 80.1 | 600 | 1 |
| comparative example 1 | alumina | 0.25 | 40 | 34.3 mm square | 217(1400) | 150 | 0.43 | 349.8 | 1000 | 3 |
| comparative example 2 | alumina | 0.25 | 40 | 34.3 mm square | 217(1400) | 150 | 0.43 | 349.8 | 900 | 8 |
| comparative example 3 | alumina | 0.25 | 50 | 34.3 mm square | 140(900) | 150 | 0.60 | 252.0 | 1000 | 1 |
| comparative example 4 | alumina | 0.25 | 65 | 34.3 mm square | 62(400) | 150 | 1.02 | 147.1 | 900 | 4 |

TABLE 1-continued

| sample | ceramic particles | wall thickness mm | X % | shape mm | cell density/cm² (cpsi) | L mm | D mm | L/d | firing temperature ° C. | firing time h |
|---|---|---|---|---|---|---|---|---|---|---|
| comparative example 5 | alumina | 0.25 | 81 | 34.3 mm square | 15.5(100) | 150 | 2.29 | 65.5 | 800 | 3 |
| comparative example 6 | alumina | 0.25 | 87 | 34.3 mm square | 7.8(50) | 150 | 3.33 | 45.0 | 800 | 1 |
| comparative example 7 | alumina | 0.25 | 87 | 34.3 mm square | 7.8(50) | 150 | 3.33 | 45.0 | 600 | 1 |
| comparative example 8 | alumina | 0.3 | 63 | 34.3 mm square | 46.5(300) | 150 | 1.17 | 128.6 | 800 | 2 |
| comparative example 9 | alumina | 0.3 | 51 | 34.3 mm square | 93(600) | 150 | 0.74 | 203.5 | 900 | 5 |
| comparative example 10 | alumina | 0.3 | 63 | 34.3 mm square | 46.5(300) | 150 | 1.17 | 128.6 | 900 | 3 |
| comparative example 11 | alumina | 0.3 | 81 | 34.3 mm square | 10.9(70) | 150 | 2.73 | 55.0 | 800 | 2 |
| comparative example 12 | alumina | 0.3 | 51 | 34.3 mm square | 93(600) | 150 | 0.74 | 203.5 | 700 | 1 |
| comparative example 13 | alumina | 0.3 | 81 | 34.3 mm square | 10.9(70) | 150 | 2.73 | 55.0 | 600 | 1 |
| example 13 | alumina | 0.25 | 65 | 22.5 mm square | 62(400) | 350 | 1.02 | 343.1 | 800 | 2 |
| example 14 | alumina | 0.25 | 65 | 48.6 mm square | 62(400) | 75 | 1.02 | 73.5 | 800 | 2 |
| example 15 | alumina | 0.2 | 60 | 27.1 mm square | 124(800) | 240 | 0.70 | 343.8 | 900 | 3 |
| example 16 | alumina | 0.2 | 60 | 59.5 mm square | 124(800) | 50 | 0.70 | 71.6 | 900 | 3 |
| comparative example 14 | alumina | 0.25 | 65 | 22.2 mm square | 62(400) | 360 | 1.02 | 352.9 | 800 | 2 |
| comparative example 15 | alumina | 0.25 | 65 | 59.5 mm square | 62(400) | 50 | 1.02 | 49.0 | 800 | 2 |
| comparative example 16 | alumina | 0.2 | 60 | 26.6 mm square | 124(800) | 250 | 0.70 | 358.2 | 900 | 3 |
| comparative example 17 | alumina | 0.2 | 60 | 71.7 mm square | 124(800) | 34.3 | 0.70 | 49.1 | 900 | 3 |
| comparative example 18 | alumina + cordierite | 0.25 | 56 | 34.3 mm square | 62(400) | 150 | 1.09 | 138.1 | — | — |

TABLE 2

| sample | ceramic particles | wall thickness mm | X % | Y m²/L | 250X + 22500 | light-off temperature CO ° C. | light-off temperature HC ° C. |
|---|---|---|---|---|---|---|---|
| example 1 | alumina | 0.25 | 65 | 55000 | 38600 | 110 | 158 |
| example 2 | alumina | 0.25 | 50 | 35000 | 34900 | 124 | 169 |
| example 3 | alumina | 0.25 | 65 | 39000 | 38600 | 122 | 165 |
| example 4 | alumina | 0.25 | 81 | 43000 | 42800 | 118 | 162 |
| example 5 | alumina | 0.25 | 50 | 52500 | 34900 | 113 | 160 |
| example 6 | alumina | 0.25 | 81 | 57000 | 42800 | 108 | 156 |
| example 7 | alumina | 0.2 | 60 | 55000 | 37600 | 108 | 155 |
| example 8 | alumina | 0.2 | 50 | 35000 | 34900 | 121 | 165 |
| example 9 | alumina | 0.2 | 60 | 38000 | 37600 | 119 | 162 |
| example 10 | alumina | 0.2 | 82 | 43000 | 42900 | 116 | 161 |
| example 11 | alumina | 0.2 | 50 | 52500 | 34900 | 109 | 157 |
| example 12 | alumina | 0.2 | 82 | 57000 | 42900 | 107 | 155 |
| comparative example 1 | alumina | 0.25 | 40 | 32500 | 32500 | 142 | 185 |
| comparative example 2 | alumina | 0.25 | 40 | 45000 | 32500 | 132 | 179 |
| comparative example 3 | alumina | 0.25 | 50 | 30000 | 34900 | 146 | 190 |
| comparative example 4 | alumina | 0.25 | 65 | 35000 | 38600 | 126 | 172 |
| comparative example 5 | alumina | 0.25 | 81 | 40000 | 42800 | 126 | 173 |
| comparative example 6 | alumina | 0.25 | 87 | 43000 | 44100 | 127 | 175 |
| comparative example 7 | alumina | 0.25 | 87 | 50000 | 44100 | 140 | 186 |
| comparative example 8 | alumina | 0.3 | 63 | 55000 | 38300 | 125 | 170 |
| comparative example 9 | alumina | 0.3 | 51 | 35000 | 35100 | 140 | 182 |
| comparative example 10 | alumina | 0.3 | 63 | 37500 | 38300 | 138 | 181 |
| comparative example 11 | alumina | 0.3 | 81 | 42500 | 42800 | 128 | 176 |
| comparative example 12 | alumina | 0.3 | 51 | 52500 | 35100 | 128 | 175 |
| comparative example 13 | alumina | 0.3 | 81 | 57000 | 42800 | 126 | 172 |
| example 13 | alumina | 0.25 | 65 | 55000 | 38600 | 121 | 166 |
| example 14 | alumina | 0.25 | 65 | 55000 | 38600 | 124 | 168 |
| example 15 | alumina | 0.2 | 60 | 55000 | 37600 | 122 | 165 |
| example 16 | alumina | 0.2 | 60 | 55000 | 37600 | 124 | 169 |
| comparative example 14 | alumina | 0.25 | 65 | 55000 | 38600 | 130 | 175 |
| comparative example 15 | alumina | 0.25 | 65 | 55000 | 38600 | 133 | 181 |
| comparative example 16 | alumina | 0.2 | 60 | 55000 | 37600 | 129 | 178 |
| comparative example 17 | alumina | 0.2 | 60 | 55000 | 37600 | 134 | 184 |
| comparative example 18 | alumina + cordierite | 0.25 | 56 | 27000 | 36500 | 160 | 200 |

What is claimed is:

1. A honeycomb structure aggregate, comprising:
a plurality of the honeycomb structures bonded together by a sealing material layer,
wherein:
each of the honeycomb structures comprises a plurality of through-holes separated by a separation wall and provided in parallel along a longitudinal direction thereof, all of the through-holes being open on both end faces of the honeycomb structure;

each of the honeycomb structures further comprises ceramic particles and an inorganic fiber and/or a whisker;

an area of a cross section of each of the honeycomb structures being perpendicular to a perforating direction of the through-holes is 5 cm² or more and 50 cm² or less;

a thickness of the separation wall is about 0.25 mm or less;

a length of each of the through-holes is about 50-fold or greater and about 350-fold or less of a hydraulic diameter of each of the through-holes; and an open area ratio (X) % of a cross section of each of the honeycomb structures perpendicular to the through-holes and a surface area per unit volume (Y (m²/L)) of the separation wall for each of the through-holes satisfy:

$Y \geq 250 \ (m^2/(L \times \%)) \times X + 22500 \ (m^2/L)$ (about $50 \leq X \leq$ about 85), and wherein the surface area per unit volume (Y) is less than or equal to about 70,000 m²/L.

2. The honeycomb structure aggregate as claimed in claim 1, wherein a thickness of the sealing material layer is about 0.5 mm or greater and about 2 mm or less.

3. A honeycomb catalyst, comprising:

a honeycomb structure aggregate carrying a catalyst, wherein the honeycomb structure aggregate comprises a plurality of honeycomb structures bonded together by a sealing material layer, wherein:

each of the honeycomb structures comprises a plurality of through-holes separated by separation wall and provided in parallel along a longitudinal direction thereof, all of the through-holes being open on both end faces of the honeycomb structure;

each of the honeycomb structures further comprises ceramic particles and an inorganic fiber and/or a whisker;

an area of a cross section of each of the honeycomb structures being perpendicular to a perforating direction of the through-holes is 5 cm² or more and 50 cm² or less;

a thickness of the separation wall is about 0.25 mm or less;

a length of each of the through-holes is about 50-fold or greater and about 350-fold or less of a hydraulic diameter of each of the through-holes; and an open area ratio (X) % of a cross section of each of the honeycomb structure structures perpendicular to the through-holes and a surface area per unit volume (Y (m²/L)) of the separation wall for each of the through-holes satisfy:

$Y \geq 250 \ (m^2/(L \times \%)) \times X + 22500 \ (m^2/L)$ (about $50 \leq X \leq$ about 85), and wherein the surface area per unit volume (Y) is less than or equal to about 70,000 m²/L.

4. The honeycomb catalyst as claimed in claim 3, wherein a thickness of the sealing material layer is about 0.5 mm or greater and about 2 mm or less.

* * * * *